(12) United States Patent
Murano

(10) Patent No.: US 11,536,675 B2
(45) Date of Patent: Dec. 27, 2022

(54) ANALYTICAL METHOD AND APPARATUS

(71) Applicant: JEOL Ltd., Tokyo (JP)

(72) Inventor: Takanori Murano, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 17/210,787

(22) Filed: Mar. 24, 2021

(65) Prior Publication Data

US 2021/0302339 A1    Sep. 30, 2021

(30) Foreign Application Priority Data

Mar. 30, 2020   (JP) .............................. JP2020-060716

(51) Int. Cl.
  *G01N 23/2252*   (2018.01)
  *G01N 23/207*    (2018.01)
  *G01N 23/2204*   (2018.01)

(52) U.S. Cl.
  CPC ..... *G01N 23/2252* (2013.01); *G01N 23/2076* (2013.01); *G01N 23/2204* (2013.01);
  (Continued)

(58) Field of Classification Search
  CPC ..... G01N 2223/0563; G01N 2223/079; G01N 2223/32; G01N 2223/413; G01N 23/2076; G01N 23/2204; G01N 23/2252; G01N 2223/0566; G01N 2223/0568; G01N 23/2209
  See application file for complete search history.

(56) References Cited

U.S. PATENT DOCUMENTS

| | | | | |
|---|---|---|---|---|
| 10,976,273 | B2 * | 4/2021 | Yun .......................... | H01J 35/18 |
| 2002/0158200 | A1 * | 10/2002 | Terauchi ............... | H01J 37/256 |
| | | | | 250/310 |

(Continued)

FOREIGN PATENT DOCUMENTS

| JP | 2000149851 A | 5/2000 |
|---|---|---|
| JP | 2002329473 A | 11/2002 |
| JP | 201935642 A | 3/2019 |

OTHER PUBLICATIONS

Extended European Search Report issued in EP21164698.9 dated Aug. 6, 2021.
Office Action issued in JP2020060716 dated Feb. 15, 2022.

*Primary Examiner* — Dani Fox
*Assistant Examiner* — Soorena Kefayati
(74) *Attorney, Agent, or Firm* — The Webb Law Firm

(57) ABSTRACT

There is provided an analytical method capable of generating a high resolution spectrum of X-rays with an intended energy. The analytical method is for use in an analytical apparatus having a diffraction grating for spectrally dispersing X-rays emanating from a sample, an image sensor for detecting the spectrally dispersed X-rays, and an incident angle control mechanism for controlling the incident angle of X-rays impinging on the diffraction grating. The image sensor has a plurality of photosensitive elements arranged in the direction of energy dispersion. The analytical method starts with specifying an energy of X-rays to be acquired. The incident angle is adjusted based on the specified energy to bring the focal plane of the diffraction grating into positional coincidence with those one or ones of the photosensitive elements which detect X-rays having the specified energy.

6 Claims, 14 Drawing Sheets

(52) U.S. Cl.
CPC ............. *G01N 2223/0563* (2013.01); *G01N 2223/079* (2013.01); *G01N 2223/32* (2013.01); *G01N 2223/413* (2013.01)

(56) References Cited

U.S. PATENT DOCUMENTS

| | | | | |
|---|---|---|---|---|
| 2014/0291518 | A1* | 10/2014 | Soejima | G01N 23/223 378/71 |
| 2014/0314207 | A1* | 10/2014 | Erko | G21K 1/067 378/82 |
| 2014/0348298 | A1* | 11/2014 | Ghammraoui | G01T 1/366 378/73 |
| 2015/0247811 | A1* | 9/2015 | Yun | G01N 23/2076 378/45 |
| 2015/0318144 | A1* | 11/2015 | Anan | H01J 37/28 250/306 |
| 2015/0362446 | A1* | 12/2015 | Kato | G01N 23/2252 250/306 |
| 2016/0033427 | A1* | 2/2016 | Ghammraoui | G01N 23/20091 378/83 |
| 2017/0067838 | A1* | 3/2017 | Anan | G01N 23/225 |
| 2017/0336334 | A1* | 11/2017 | Yun | G01N 23/2076 |
| 2018/0202948 | A1* | 7/2018 | Sato | G01N 23/207 |
| 2018/0202951 | A1* | 7/2018 | Yun | G01N 23/20025 |
| 2019/0006146 | A1* | 1/2019 | Sakamae | G01N 23/2252 |
| 2019/0011379 | A1* | 1/2019 | Yun | H01J 35/12 |
| 2019/0017948 | A1* | 1/2019 | Anan | G02B 27/0944 |
| 2019/0049396 | A1* | 2/2019 | Murano | G01N 23/2252 |
| 2019/0113468 | A1* | 4/2019 | Hoenes | G01N 23/20 |
| 2019/0212281 | A1* | 7/2019 | Shchegrov | G01N 23/2273 |
| 2019/0302042 | A1* | 10/2019 | Yun | G01N 23/223 |
| 2020/0158667 | A1* | 5/2020 | Xiang | G01N 23/2055 |
| 2020/0225172 | A1* | 7/2020 | Sato | G01N 23/223 |
| 2020/0225173 | A1* | 7/2020 | Sato | G01N 23/2076 |

\* cited by examiner

ANALYTICAL METHOD AND APPARATUS

CROSS-REFERENCE TO RELATED APPLICATION

This application claims priority to Japanese Patent Application No. 2020-060716 filed Mar. 30, 2020, the disclosure of which is hereby incorporated by reference in its entirety.

BACKGROUND OF THE INVENTION

1. Field of the Invention

The present invention relates to an analytical method and apparatus.

2. Description of the Related Art

There is a known method for performing elemental analysis of a sample by irradiating it with an electron beam and detecting X-rays emanating from the sample.

A known analytical apparatus using such a technique is a soft X-ray analyzer which irradiates a sample with an electron beam, collects soft X-rays generated from the sample by means of a mirror, spectrally disperses the collected X-rays with a diffraction grating, detects the dispersed X-rays with a CCD-based X-ray image sensor, and derives a spectrum. Soft X-rays are X-rays having quite low energies of about 0.01 keV to 5 keV.

A soft X-ray analyzer includes a diffraction grating that can spectrally disperse X-rays at high resolution. In order to detect X-rays with an image sensor while maintaining the resolution possessed by the diffraction grating, it is necessary to bring the focal plane of the diffraction grating into positional coincidence with the photosensitive surface of the CCD image sensor. For this purpose, an analyzer disclosed, for example, in JP-A-2019-35642 uses a varied-space diffraction grating. Consequently, the energy range in which the resolution possessed by the diffraction grating can be maintained can be extended. Hence, high resolution spectra can be obtained over a wide energy range.

However, if such a varied-space diffraction grating is used, it is difficult to bring the focal plane of the diffraction grating into positional coincidence with the photosensitive surface of the image sensor over the whole energy range. Therefore, if a varied-space diffraction grating is used, a spectrum may not be obtained at the high resolution intrinsic to the diffraction grating at an intended energy.

SUMMARY OF THE INVENTION

One aspect of the analytical method associated with the present invention is for use in an analytical apparatus which comprises:

a spectrally dispersive element for spectrally dispersing X-rays that are incident on the spectrally dispersive element at an incident angle after emanating from a sample;

an image sensor operative to detect the dispersed X-rays and a plurality of photosensitive elements arranged in a direction of energy dispersion; and an incident angle control mechanism for controlling the incident angle of the X-rays incident on the spectrally dispersive element.

The analytical method involves the steps of specifying an energy of X-rays to be acquired and adjusting the incident angle based on the specified energy to bring the focal plane of the spectrally dispersive element into positional coincidence with those one or ones of the photosensitive elements which detect X-rays having the specified energy.

In this analytical method, the focal plane of the diffraction grating is brought into positional coincidence with those one or ones of the photosensitive elements which detect X-rays having the specified energy by adjusting the incident angle based on the specified energy. Consequently, a high resolution spectrum can be obtained at the intended energy.

One aspect of the analytical apparatus associated with the present invention comprises:

a spectrally dispersive element for spectrally dispersing X-rays that are incident on the spectrally dispersive element at an incident angle after emanating from a sample;

an image sensor operative to detect the dispersed X-rays and having a plurality of photosensitive elements arranged in a direction of energy dispersion;

an incident angle control mechanism for controlling the incident angle of the X-rays incident on the spectrally dispersive element; and a controller for controlling the incident angle control mechanism.

The controller controls the incident angle control mechanism based on a specified energy of X-rays to bring the focal plane of the spectrally dispersive element into positional coincidence with those one or ones of the photosensitive elements which detect X-rays having the specified energy.

In this analytical apparatus, the controller controls the incident angle control mechanism based on the specified energy to thereby bring the focal plane of the diffraction grating into positional coincidence with those one or ones of the photosensitive elements which detect X-rays having the specified energy. In consequence, a high resolution spectrum can be derived at the intended energy.

DETAILED DESCRIPTION OF THE INVENTION

The preferred embodiments of the present invention are hereinafter described in detail with reference to the drawings. It is to be understood that the embodiments provided below do not unduly restrict the scope and content of the present invention delineated by the appended claims and that not all the configurations described below are essential constituent components of the invention.

1. First Embodiment 1.1. Analytical Apparatus

Figure 1:
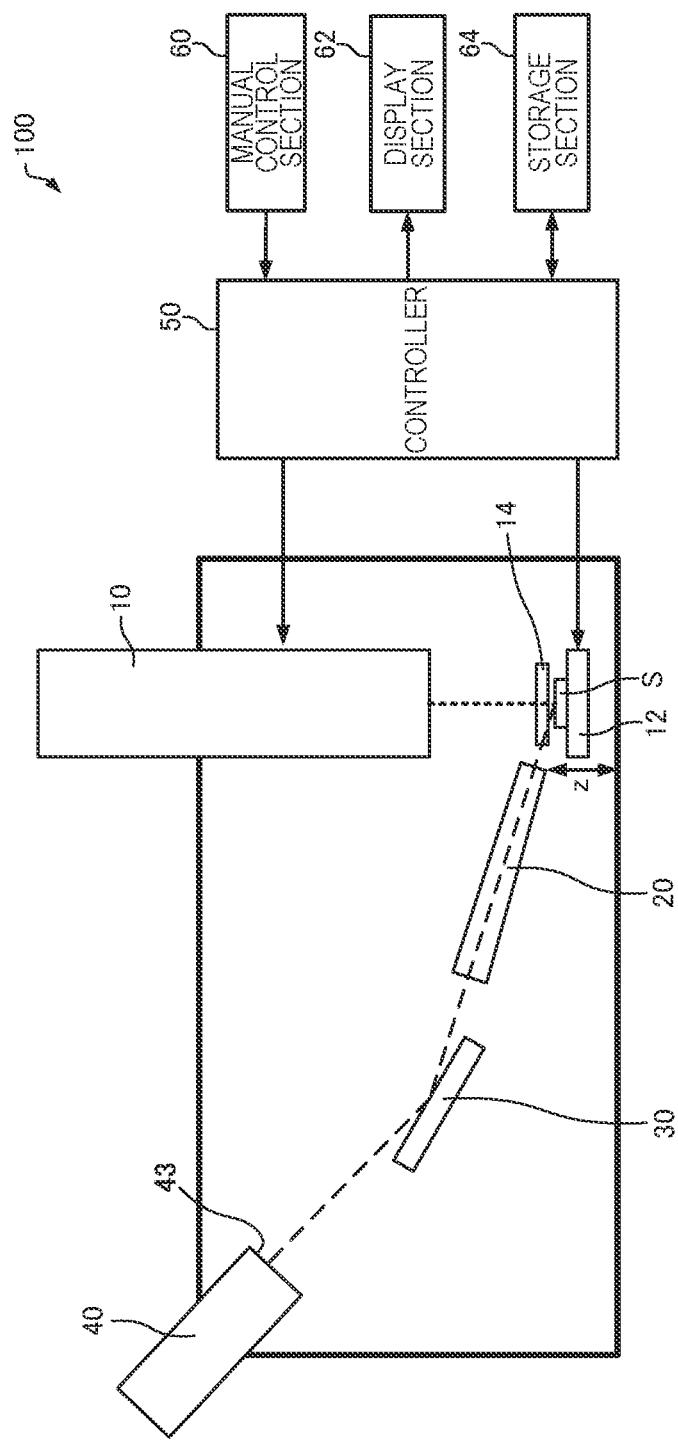
FIG. 1 is a block diagram of an analytical apparatus associated with a first embodiment of the present invention.

An analytical apparatus associated with a first embodiment is first described by referring to FIG. 1, which shows the configuration of the analytical apparatus, 100, associated with the first embodiment.

As shown in FIG. 1, the analytical apparatus 100 includes an electron optical system 10, a sample stage 12, an X-ray collector mirror 20, a diffraction grating 30 (one example of an spectrally dispersive element), an image sensor 40, a controller 50, a manual control section 60, a display section 62, and a storage section 64. The analytical apparatus 100 is a soft X-ray analyzer which acquires a soft X-ray spectrum (hereinafter may simply be referred to as an X-ray spectrum) by spectrally dispersing soft X-rays (hereinafter may simply be referred to as X-rays) emanating from a sample S as it is irradiated with an electron beam and detecting the dispersed soft X-rays.

The electron optical system 10 operates to direct the electron beam to the sample S, and includes, for example, an electron gun emitting the electron beam, an illumination lens system for focusing the electron beam onto the sample S, and deflectors for deflecting the electron beam. The electron optical system 10 permits the electron beam to hit the sample S at a desired position.

The sample stage 12 supports the sample S. The sample stage 12 has a drive mechanism for moving the sample S along its height, i.e., in the illustrated z direction which lies along the optical axis of the electron optical system 10 in the illustrated example.

In the analytical apparatus 100, electrostatic deflecting plates 14 are placed above the sample S. Characteristic soft X-rays are produced from the sample S in response to irradiation of the sample S with the electron beam. In addition, backscattered electrons, secondary electrons, and others are generated from the sample S. Such backscattered electrons, secondary electrons, and so on can be removed by placing the electrostatic deflecting plates 14. The electric potential applied to the electrostatic deflecting plates 14 is variable. The background can be reduced by applying the potential according to the accelerating voltage of the electron beam.

The X-ray collector mirror 20 collects X-rays released from the sample S and guides them to the diffraction grating 30. By collecting the X-rays by the X-ray collector mirror 20, the intensity of X-rays incident on the diffraction grating 30 can be increased. Consequently, a decrease in the measurement time and improvement of the S/N of spectra can be accomplished.

The diffraction grating 30 spectrally disperses the X-rays produced from the sample S. If X-rays are made to impinge on the diffraction grating 30 at a certain angle, X-rays dispersed into different wavelength bands (energy bands) can be obtained. For example, the diffraction grating 30 is a varied-space diffraction grating provided with unequally spaced grooves for aberration correction. When X-rays are made to impinge at a large incident angle, the diffraction grating 30 forms a focus of diffracted X-rays on the photosensitive surface 43 of the image sensor 40, not on a Rowland circle.

The image sensor 40 is a detector which detects diffracted X-rays spectrally dispersed by the diffraction grating 30. The image sensor 40 is an imager that is highly sensitive to soft X-rays. For example, the image sensor 40 is a CCD (Charge-Coupled Device) image sensor, a CMOS (Complementary MOS) image sensor, a back-illuminated CCD image sensor, or the like.

The manual control section 60 permits the user to enter manual control information and outputs the entered manual control information to the controller 50. The function of the manual control section 60 can be realized by a hardware device such as a keyboard, mouse, buttons, touch panel, or the like.

The display section 62 operates to display the images created by the controller 50. The function of the display section 62 can be realized by an LCD (liquid crystal display), or CRT (cathode ray tube), a touch panel capable of operating also as the manual control section 60, or other display device.

The storage section 64 stores programs and various kinds of data enabling the controller 50 to operate as a computer. The storage section 64 also acts as a working area for the controller 50. The function of the storage section 64 can be realized by a hard disk, a RAM (random access memory), or the like.

The functions of the controller 50 (computer) can be accomplished by executing computer programs by means of a hardware device such as various processors (e.g., CPUs (central processing units)) or DSP (digital signal processor). The controller 50 performs processing to control various portions of the analytical apparatus 100 as well as various kinds of computational processing.

The controller 50 performs a processing operation for accepting a designation of energies and a processing operation for bringing the focal plane of the diffraction grating 30 into positional coincidence with the photosensitive surface of the image sensor 40 that detects X-rays of the specified energy by adjusting the incident angle of the X-rays incident on the diffraction grating 30 based on the specified energy. The processing of the controller 50 is described in further detail later.

Figure 2:
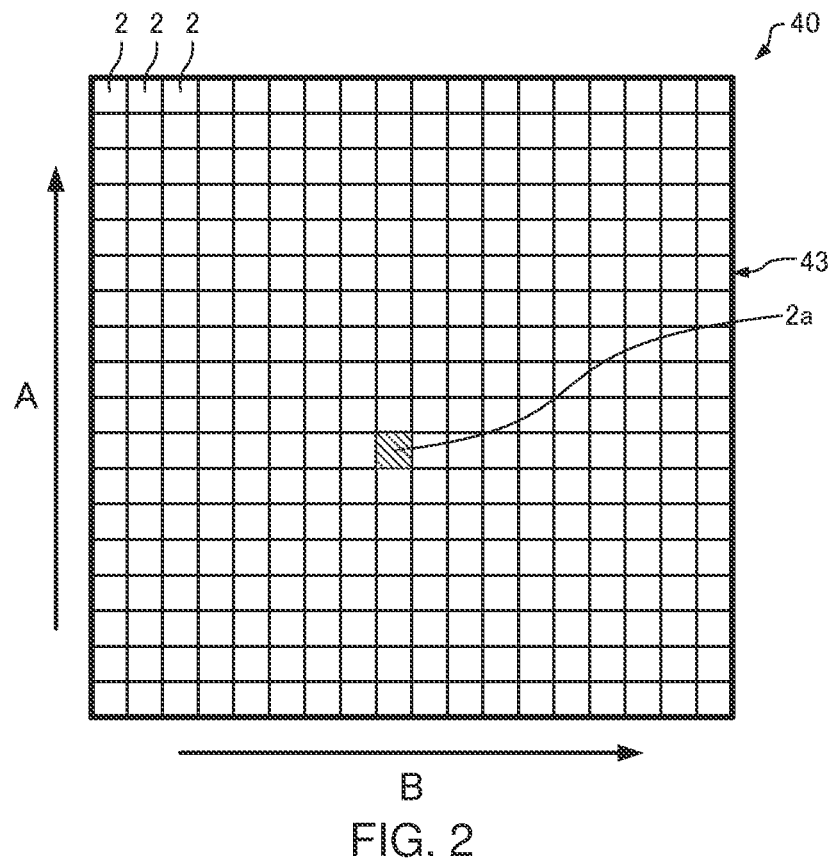
FIG. 2 is a schematic plan view of the photosensitive surface of an image sensor.

FIG. 2 is a schematic plan view of the photosensitive surface 43 of the image sensor 40. As shown in FIG. 2, the image sensor 40 has a plurality of photosensitive elements arranged in the direction of energy dispersion A. Each photosensitive element can detect X-rays independently. X-rays are spectrally dispersed into different wavelength bands by the diffraction grating 30, and the different wavelengths bands can be independently detected by the image sensor 40. Each of the photosensitive elements 2 corresponds to one pixel, for example, of the image sensor 40. Each photosensitive element 2 may be formed from mutually adjacent ones of the pixels of the image sensor 40.

In the illustrated example, the photosensitive elements 2 of the image sensor 40 are arranged also in the direction of X-ray divergence B which is perpendicular to the direction of energy dispersion A. The photosensitive elements 2 arranged in the direction of divergence B can detect X-rays having the same energy (wavelength).

In the analytical apparatus 100, if an electron beam is directed at the sample S through the electron optical system 10, X-rays are produced from the sample S. The X-rays are collected by the X-ray collector mirror 20 and impinge on the diffraction grating 30. Then, the X-rays exit the diffraction grating 30 at exit angles corresponding to their wavelengths (energies) and hit the photosensitive surface 43 of the image sensor 40. The X-rays are detected by the photosensitive elements 2 arranged in the direction of dispersion A. Information about the intensities of the X-rays detected by the photosensitive elements 2 can be derived from the output signal from the image sensor 40. The controller 50 creates an X-ray spectrum based on the information about the intensities of the X-rays detected by the photosensitive elements 2.

1.2. Analytical Method

An analytical method for use in the analytical method 100 is next described. This analytical method involves the steps of: specifying an energy of X-rays to be derived; and bringing the focal plane of the diffraction grating 30 into positional coincidence with those one or ones of the photosensitive elements 2 which detect X-rays of the specified energy by adjusting the incident angle of X-rays impinging on the diffraction grating 30 based on the specified energy.

Figure 3:
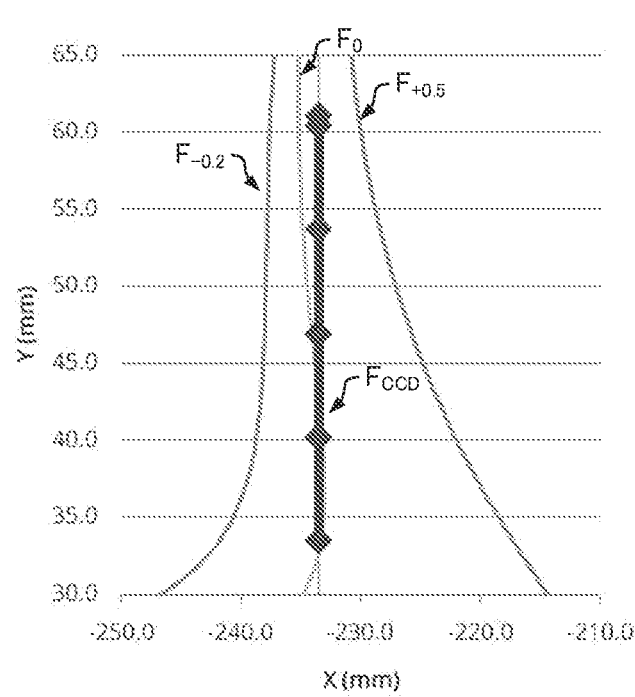
FIG. 3 is a diagram showing the focal plane of a diffraction grating.

1.2.1. Positional Relationship Between Focal Plane of Diffraction Grating and Photosensitive Surface of Image Sensor FIG. 3 shows the focal plane of the diffraction grating 30 as well as the photosensitive surface 43 of the image sensor 40. The focal plane $F_0$ shown in FIG. 3 is assumed when the diffraction grating 30 is in its reference position, i.e., positioned ideally. Another focal plane $F_{-0.2}$ of the diffraction grating 30 is assumed when the X-ray incident angle has been shifted by −0.2°. A further focal plane $F_{+0.5}$ indicates the focal plane of the diffraction grating 30 when the X-ray incident angle is shifted by +0.5°. The photosensitive surface $F_{CCD}$ indicates the photosensitive surface 43 of the image sensor 40.

The Y axis shown in FIG. 3 is parallel to the direction of energy dispersion A shown in FIG. 2. The X axis is perpendicular to the Y axis and indicates the distance between the diffraction grating 30 and the image sensor 40. In an example set forth later in relation to FIG. 5, the X axis is parallel to the diffraction plane 31, while the Y axis is parallel to the photosensitive surface 43 of the image sensor 40.

In the graph of FIG. 3, the locations where the photosensitive surface $F_{CCD}$ and the focal plane overlap mean that the photosensitive surface $F_{CCD}$ and the focal plane are in coincidence. Therefore, in the locations of overlap, X-ray spectra can be obtained while maintaining high energy resolution possessed by the diffraction grating 30. If the focal plane deviates from the photosensitive surface $F_{CCD}$ (defocus), the resolution of X-ray spectra deteriorates.

Where the diffraction grating 30 is placed in its reference position as shown in FIG. 3, the focal plane $F_0$ and the photosensitive surface $F_{CCD}$ agree in position in the lower part of the image sensor 40. However, in the upper part of the image sensor 40, the focal surface $F_0$ deviates from the photosensitive surface $F_{CCD}$. The energies of X-rays detected by the photosensitive elements 2 in the upper part of the image sensor 40 are lower than those of X-rays detected by the photosensitive elements 2 in the lower part of the image sensor 40. Therefore, where the diffraction grating 30 is placed in its reference position, high energy resolution cannot be obtained on the lower energy side of each spectrum.

Figure 4:
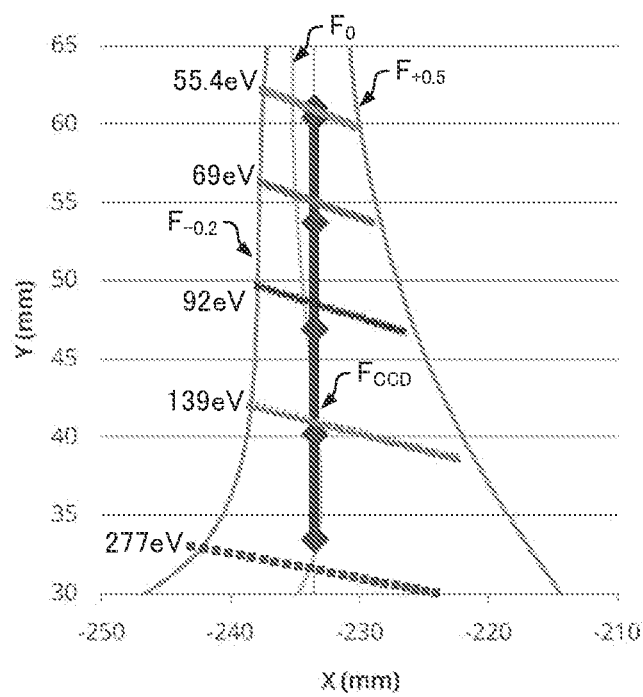
FIG. 4 is a diagram illustrating a relationship between the incident angle of X-rays and the focal plane of the diffraction grating.

FIG. 4 illustrates the relationship between the incident angle of X-rays and the focal plane of the diffraction grating 30. Shown in FIG. 4 are the focal surface $F_0$, focal surface $F_{-0.2}$, focal surface $F_{+0.5}$, and photosensitive surface $F_{CCD}$. Further plotted in FIG. 4 are X-ray focal positions when the incident angle of X-rays is varied for X-rays of 277 eV, X-rays of 239 eV, X-rays of 92 eV, X-rays of 69 eV, and X-rays of 55.4 eV.

The position of the focal plane moves by varying the incident angle of X-rays relative to the diffraction grating 30 as shown in FIG. 4. Therefore, the focal plane of the diffraction grating 30 can be brought into positional coincidence with those one or ones of the photosensitive elements 2 which detect X-rays of a desired energy by adjusting the incident angle of X-rays.

Figure 5:
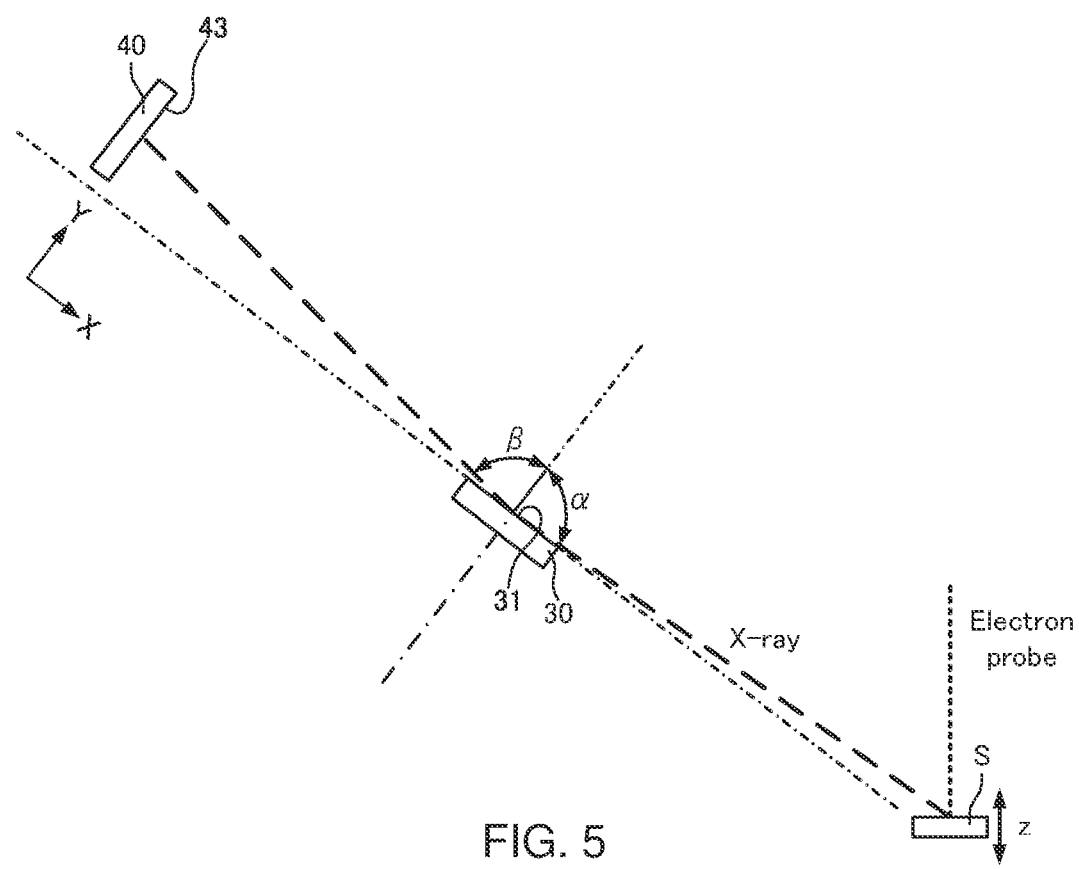
FIG. 5 is a diagram illustrating a technique for bringing the focal plane of the diffraction grating into positional coincidence with the photosensitive surface of the image sensor.

FIG. 5 illustrates a technique for bringing the focal plane of the diffraction grating 30 into positional coincidence with the photosensitive surface 43 of the image sensor 40. As shown in FIG. 5, the incident angle α of X-rays relative to the diffraction grating 30 varies as the sample S is moved in the z direction. In the analytical apparatus 100, the sample stage 12 has a z drive mechanism for moving the sample S in the z direction. Therefore, the incident angle α of X-rays can be adjusted by moving the sample S in the z direction using the sample stage 12. Consequently, in the analytical apparatus 100, the focal plane of the diffraction grating 30 can be brought into positional coincidence with those one or ones of the photosensitive elements 2 which detect an intended energy. At this time, the position and angle of the diffraction grating 30 are held constant. For example, the diffraction grating 30 is placed in its reference position. In this way, in the analytical apparatus 100, the sample stage 12 operates as an incident angle control mechanism for controlling the incident angle α of X-rays by means of the sample stage 12.

1.2.2. Calculation of Amount of Movement Δz

In the analytical method for use in the analytical apparatus 100, as noted above, the focal plane of the diffraction grating 30 is brought into positional coincidence with those one or ones of the photosensitive elements 2 which detect X-rays of the specified energy by driving the sample stage 12 based on the specified energy. A method of calculating the amount of movement Δz of the sample S when it is moved by the sample stage 12 is described below.

Figure 6:
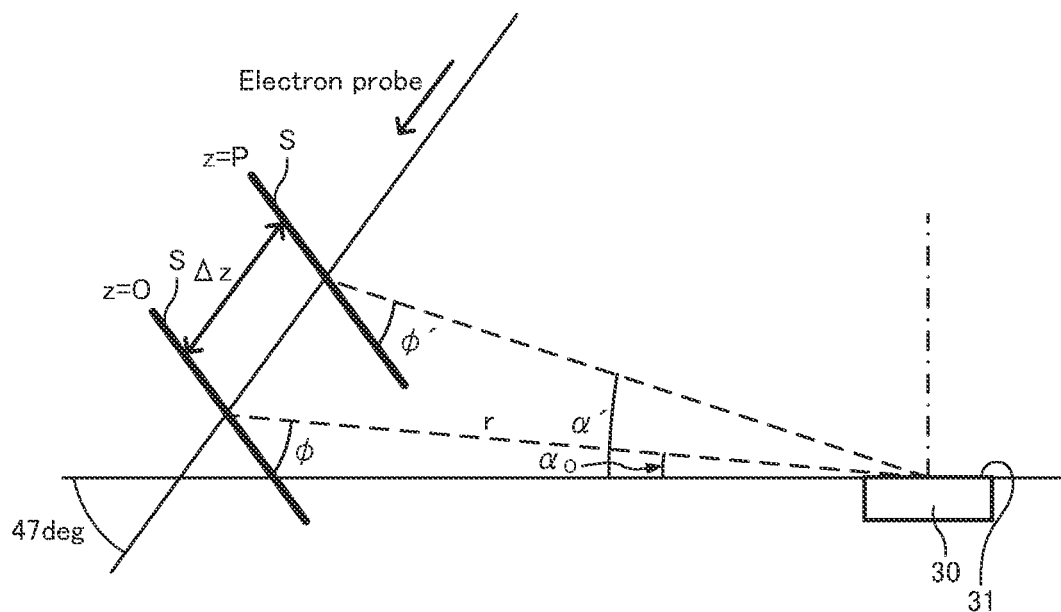
FIG. 6 is a diagram illustrating the positional relationship between a sample and a diffraction grating.

FIG. 6 illustrates the positional relationship between the sample S and the diffraction grating 30. When the sample S is in its initial position (z=O), it is assumed that the incident angle of X-rays is $\alpha_O$ and the incidence length between the X-ray source and the incident position of X-rays at the diffraction grating 30 is r. Let φ be the X-ray takeoff angle. When the sample S is moved the amount of movement Δz from its initial position (z=O) such that the sample S is placed in an intended position z=P, the X-ray takeoff angle φ' is given by $$\phi'=\tan^{-1}((r\sin\phi-\Delta z)/r\cos\phi) \quad (1)$$

When the sample S is in the intended position z=P, the incident angle α' of X-rays relative to the diffraction grating 30 is given by $$\alpha'=180-(47+90+\phi') \quad (2)$$

It is herein assumed that the angle formed between the incident angle of an electron beam impinging on the sample S and the diffraction plane 31 of the diffraction grating 30 is 47°.

When the sample S is in its initial position (z=O), the focal position of the diffraction grating 30 is expanded using the following paraxial image points (in polar coordinates (r', β')).

$$r'=\cos^2\beta'/(\cos\alpha_O+\cos\beta')/R-\cos^2\alpha_O/r-2n_2(m\lambda/\sigma)) \quad (3)$$

$$\beta'=\sin^{-1}(m\lambda/\sigma-\sin\alpha_O) \quad (4)$$

where σ, R, $n_2$ are parameters of the diffraction grating 30 and are constants. λ is an X-ray wavelength and m is a diffraction order.

Because there is a relationship between X-ray energy E and X-ray wavelength λ as given by λ≅1240/E, the wavelength λ can be converted into the X-ray energy E.

If the incident angle α of X-rays is known, the position of the focal plane of the diffraction grating 30 can be computed using Eqs. (3) and (4) above. If an intended energy or wavelength is specified, the distance between the photosensitive element 2a for detecting the intended energy and the focal plane (r', β') can be found. Furthermore, the incident angle α' can be calculated under the condition where the focal plane and the photosensitive element 2a are coincident in position. If this incident angle α' is known, then the amount of movement Δz can be calculated using Eqs. (2) and (1) above.

That is, the amount of movement Δz of the sample S to bring the focal plane of the diffraction grating 30 into positional coincidence with the photosensitive element 2a for detecting X-rays of the intended energy (wavelength) can be calculated using Eqs. (1)-(4) above.

The foregoing description is based on the assumption that the incident angle $\alpha_O$ at the initial position (z=O) is known. However, the incident angle $\alpha_O$ can be found, for example, using Eq. (5) given below.

Figure 7:
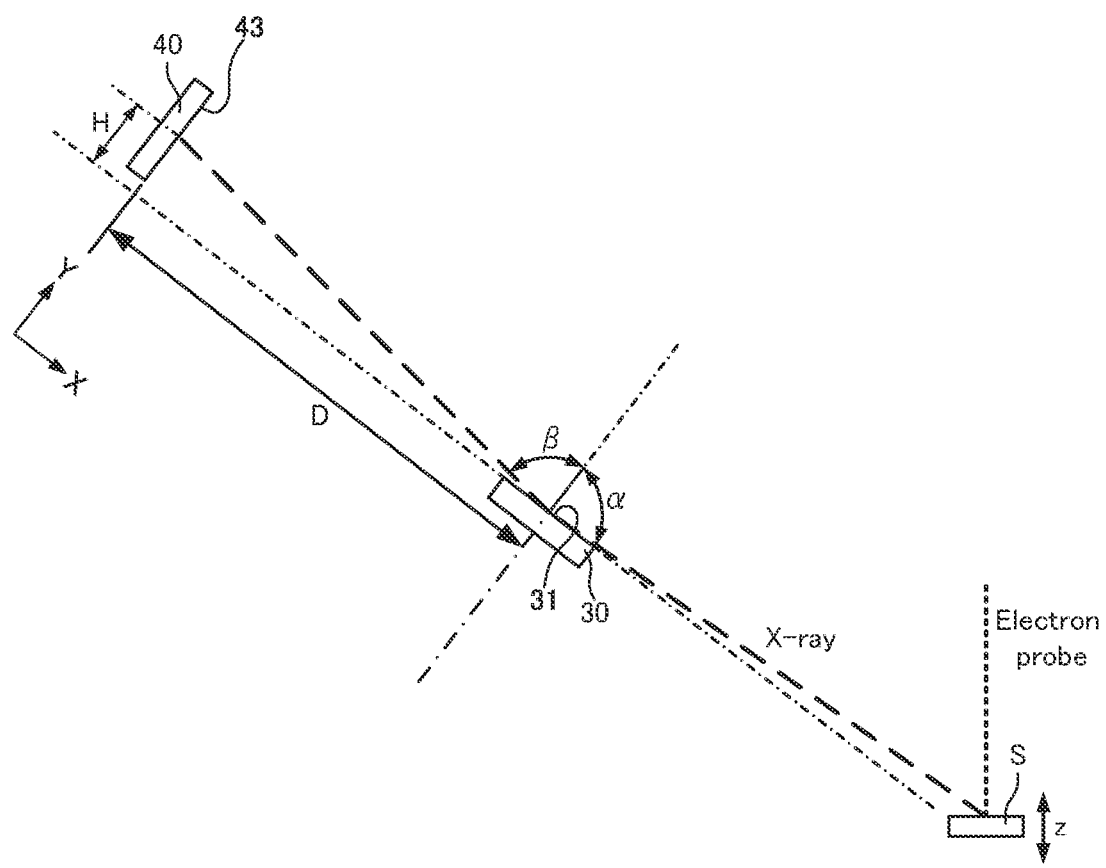
FIG. 7 is a diagram illustrating a technique for calculating the incident angle.

FIG. 7 illustrates a technique for calculating the incident angle α. The incident angle α of X-rays relative to the diffraction grating 30 can be found by the following equation.

$$d(\sin\alpha-\sin(\tan^{-1}(H/D)))=\lambda \quad (5)$$

where d is the lattice constant (lattice period) of the diffraction grating 30. D is the distance between the diffraction grating 30 and the photosensitive surface 43, taken in the X direction, as shown in FIG. 7. H is the height of the photosensitive element 2a for detecting the intended energy (wavelength) as shown in FIG. 7, as taken in the Y direction. Note that Eq. (5) is derived from a theoretical formula for diffraction gratings, the theoretical formula being given by $$d(\sin\alpha-\sin\beta)=m\lambda$$

where d is the lattice constant (lattice period) of the diffraction grating 30, m is the diffraction order which is fundamentally equal to unity, λ is the wavelength of X-rays, α is the incident angle of X-rays relative to the diffraction grating 30, and β is the exit angle of X-rays relative to the diffraction grating 30. Using the distance D between the diffraction grating D and the photosensitive surface 43 and the height H of the photosensitive element 2a for detecting X-rays of wavelength λ, the exit angle β is given by tan β=H/D. Consequently, Eq. (5) above is derived.

1.3. Operation of Analytical Apparatus

Figure 8:
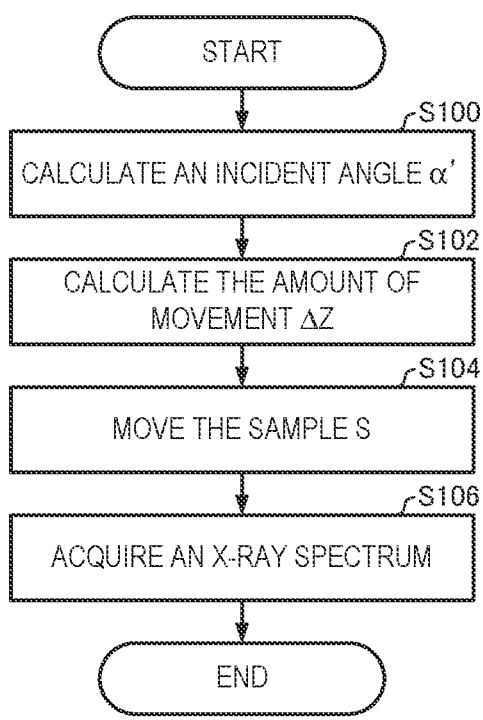
FIG. 8 is a flowchart illustrating one example of the operation of an analytical apparatus associated with a first embodiment of the present invention.

FIG. 8 is a flowchart illustrating one example of the operational sequence of the analytical apparatus 100. Before processing is done by the controller 50, it is assumed that the position of the sample S as taken in the z direction is the initial position (z=O). This may be achieved by the user, for example, by manually actuating the sample stage 12 to adjust the height of the sample S. Alternatively, the controller 50 may actuate the sample stage 12 to set the sample S at its initial position (z=O). At this time, the focal plane of the diffraction grating 30 is at the focal plane $F_0$ shown in FIG. 3.

If input for specifying an intended energy is accepted, for example, from the manual control section 60, the controller 50 calculates an incident angle α' at which the focal plane of the diffraction grating 30 is coincident in position with the photosensitive element 2a for detecting the specified energy (S100).

The controller 50 calculates the incident angle α' from the incident angle $\alpha_0$ occurring at the initial position (z=O), the incidence length r at the initial position (z=O), and the intended energy E using Eqs. (3) and (4).

The incident angle $\alpha_O$ occurring at the initial position (z=O) and the incidence length r at the initial position (z=O) are previously stored in the storage section 64. The incident angle $\alpha_O$ occurring at the initial position (z=O) can be computed from Eq. (5).

Then, the controller 50 calculates the amount of movement Δz of the sample S in the z direction from the obtained incident angle α' (S102). The controller 50 calculates the takeoff angle φ' from the incident angle α' using Eq. (2) and calculates the amount of movement Δz from the takeoff angle φ' using Eq. (1).

The controller 50 then causes the sample stage 12 to move the sample S the calculated amount Δz in the z direction (S104). Consequently, the focal plane of the diffraction grating 30 can be brought into positional coincidence with the photosensitive element 2a for detecting X-rays of the specified energy.

Then, the controller 50 acquires an X-ray spectrum (S106). In the analytical apparatus 100, such an X-ray spectrum is acquired by irradiating the sample S with an electron beam by means of the electron optical system 10, spectrally dispersing X-rays produced from the sample S by the diffraction grating 30, and detecting the dispersed X-rays by the image sensor 40. At this time, X-rays of the intended energy are detected by the photosensitive element 2a. The X-ray spectrum acquired by the image sensor 40 is sent to the controller 50. As a result of the processing described so far, a high resolution spectrum of X-rays of the specified energy can be obtained.

If there is a need for an X-ray spectrum at the original reference position (i.e., an arrangement resulting in the focal plane $F_O$ shown in FIG. 3), then the sample stage 12 is actuated to return the sample S to its initial position (z=O).

1.4. Operation and Effects

The analytical method for use in the analytical apparatus 100 involves the steps of specifying an energy of X-rays to be obtained and adjusting the incident angle α based on the specified energy to bring the focal plane of the diffraction grating 30 into positional coincidence with the photosensitive element 2a for detecting X-rays of the specified energy. Therefore, a high resolution spectrum of X-rays having the intended energy can be easily obtained.

In the analytical method for use in the analytical apparatus 100, the incident angle α of X-rays is adjusted by moving the sample S with the sample stage 12. Therefore, a high resolution spectrum of X-rays of the intended energy can be easily derived.

In the analytical apparatus 100, the controller 50 brings the focal plane of the diffraction grating 30 into positional coincidence with the photosensitive element 2a for detecting X-rays of the specified energy by controlling the actuation of the sample stage 12 based on the specified X-ray energy. Therefore, with the analytical apparatus 100, a high resolution spectrum of X-rays with the intended energy can be easily obtained.

1.5. Modified Embodiments

1.5.1. First Modified Embodiment (1) Configuration of Analytical Apparatus

An analytical apparatus associated with a first modified embodiment is first described. In the following description, only differences with the above-described analytical apparatus 100 are set forth; a description and illustration of similarities is omitted.

The analytical apparatus associated with the first modified embodiment is similar in function to the analytical apparatus 100 already set forth in connection with FIG. 1 and thus a description and illustration thereof is omitted.

(2) Calibration

The controller 50 of the analytical apparatus associated with the first modified embodiment calibrates the energy axis of the derived X-ray spectrum. In particular, the controller 50 finds the energy of X-rays detected at each photosensitive element 2 based on the positional relationship between the sample S and the diffraction grating 30 and on the positional relationship of the diffraction grating 30 to the photosensitive elements 2, and calibrates the energy axis.

In a first case, calibration of the energy axis is to convert an axis indicative of the positions of the photosensitive elements 2 into the energy axis. In a second case, calibration of the energy axis is to correct a preset energy axis such that a new energy axis is set. In the following description, the first case is set forth.

An X-ray spectrum of a reference sample is obtained by performing the above-described processing sequence illustrated in FIG. 8.

Figure 9:
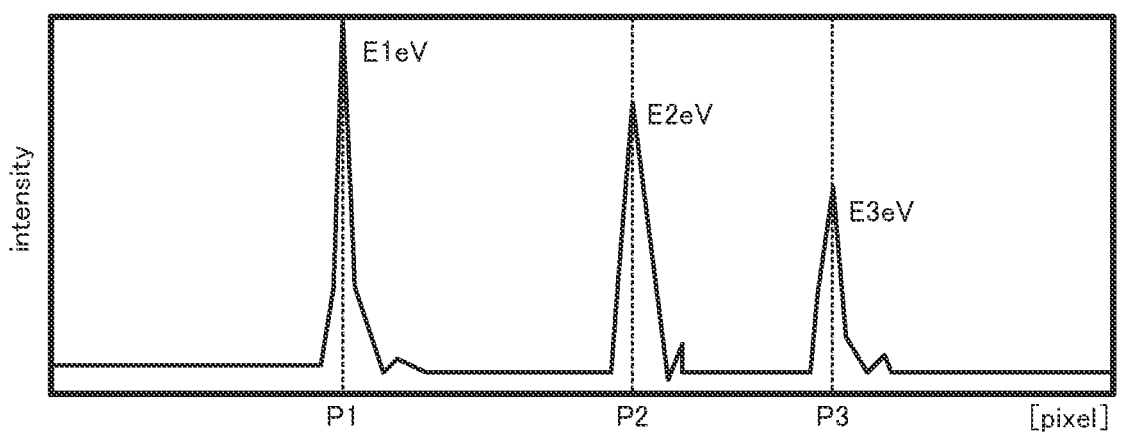
FIG. 9 is a diagram schematically showing a spectrum obtained by measuring a reference sample.

FIG. 9 schematically shows the spectrum obtained by measuring a reference sample. Since the energy axis is not calibrated, the horizontal axis of the spectrum shown in FIG. 9 indicates the positions of the photosensitive elements 2, taken in the energy dispersion direction A, each photosensitive element 2 representing one pixel. The vertical axis of the spectrum shown in FIG. 9 indicates the intensity of X-rays detected by each photosensitive element 2.

Since the energy values of the peaks in the spectrum shown in FIG. 9 have been measured using a reference sample, the values are known. A reference sample gives rise to a spectrum having known peak energy values.

The spectrum shown in FIG. 9 is observed to have peaks at pixels P1, P2, and P3. The spectrum of FIG. 9 has been measured using the reference sample, and the three peaks have known energy values. In the example of FIG. 9, the peaks at the pixels P1, P2, and P3 have energy values of E1 eV, E2 eV, and E3 eV, respectively.

Then, the positional relationship between the sample S and the diffraction grating 30 and the positional relationship of the diffraction grating to the photosensitive elements 2 are found. In particular, the incident angle α, distance D, and height H of Eq. (5) above are used as parameters. Using these parameters, data sets of peak positions and energies are derived from the spectrum shown in FIG. 9. Optimum solutions to these parameters are found by a least squared method or other method. The spectrum shown in FIG. 9 produces a data set of pixel P1 and E1 eV, a data set of pixel P2 and E2 eV, and a data set of pixel P3 and E3 eV. Therefore, using these data sets, optimum solutions to the incident angle α, distance D, and height H of Eq. (5) above are found.

The incident angle α, distance D, and height H are the parameters related to the optical arrangement of the diffraction grating 30 and image sensor 40. That is, they are parameters concerning the positional relationship (optical positional relationship) between the sample S and the diffraction grating 30 and the positional relationship (optical positional relationship) between the diffraction grating 30 and the image sensor 40.

For example, the incident angle α is a parameter determined by the positional relationship between the sample S and the diffraction grating 30. The distance D can be adjusted by varying the position of the diffraction grating 30 or the position of the image sensor 40. The height H can be adjusted by varying the position of the image sensor 40 (the position of the photosensitive surface 43). That is, the distance D and height H are parameters determined by the positional relationship between the diffraction grating 30 and the image sensor 40.

Then, the energies of X-rays detected by the photosensitive elements 2 are found. By obtaining optimum solutions to the incident angle α, distance D, and height H, the energies (wavelengths) of X-rays detected by the photosensitive elements 2 arranged in the energy dispersion direction A can be uniquely found from Eq. (5) above.

Figure 10:
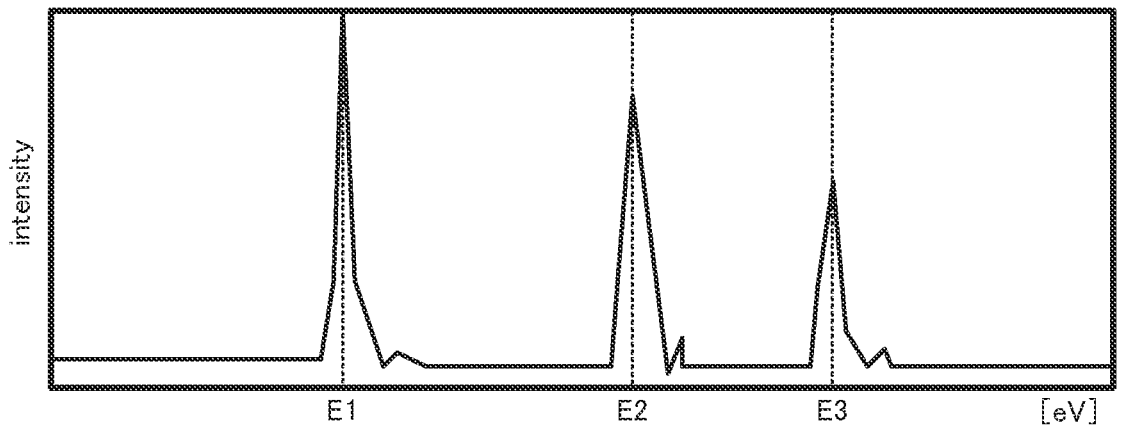
FIG. 10 is a graph produced by converting the horizontal axis of FIG. 9 into X-ray energy from photosensitive element position.

FIG. 10 is a graph generated by converting the horizontal axis of the spectrum shown in FIG. 9 from the position (pixel) of each photosensitive element 2 into an X-ray energy (in eV). As shown in FIG. 10, it is seen from Eq. (5) above that the horizontal axis of the spectrum can be converted from an axis indicative of position of each photosensitive element 2 into an energy axis by finding the energies of X-rays detected by the photosensitive elements 2 arranged in the energy dispersion direction A. In this way, the energy axis of a spectrum can be calibrated.

(3) Operation of Analytical Apparatus

Figure 11:
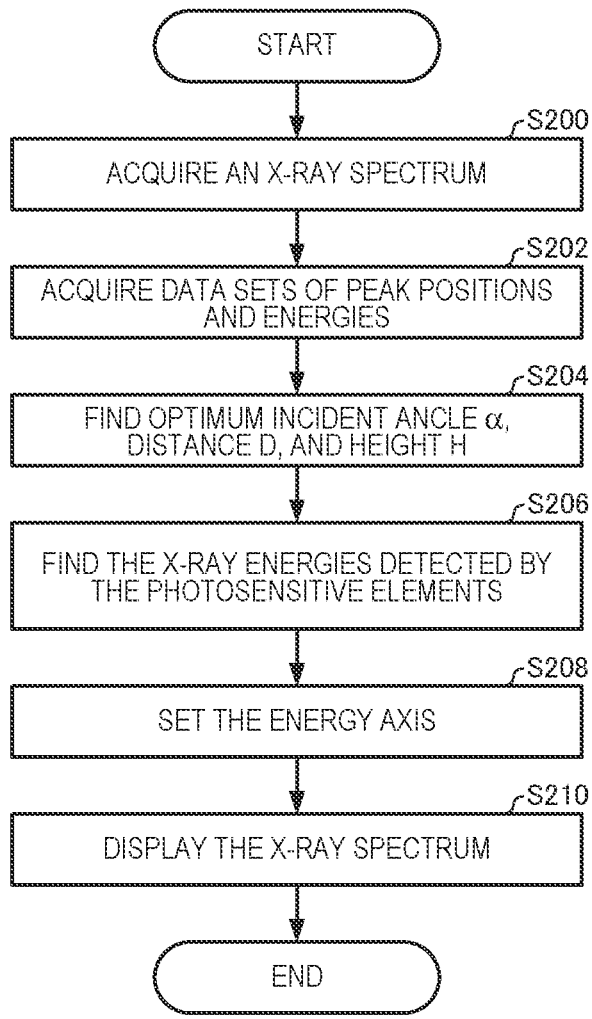
FIG. 11 is a flowchart illustrating one example of the operation of an analytical apparatus associated with a first modified embodiment.

FIG. 11 is a flowchart illustrating one example of operational sequence of the analytical apparatus associated with the first modified embodiment. First, the controller 50 acquires an X-ray spectrum of the sample S (S200). In particular, the controller 50 acquires an X-ray spectrum by performing the above-described processing of FIG. 8.

Then, the controller 50 acquires data sets of peak positions and energies (S202). The acquisition of the data sets is carried out by measuring a reference sample with the analytical apparatus. The X-ray spectrum of the reference sample shown in FIG. 9 is acquired, and information about peak positions is obtained. Information about energies corresponding to the peak positions is derived from a database of energies of peaks (X-ray species) obtained by measuring the reference sample. Information about energies corresponding to peak positions may be entered by the user by entering the information through the manual control section 60.

Then, the controller 50 finds optimum solutions to the parameters, i.e., incident angle $\alpha$, distance D, and height H, of Eq. (5) above by a least squares method or other method using the acquired data sets (S204). The found incident angle $\alpha$, distance D, and height H are stored in the storage section 64.

The controller 50 then finds the X-ray energies detected by the photosensitive elements 2 by inserting the found incident angle $\alpha$, distance D, and height H into Eq. (5) above (S206). The controller 50 sets the energy axis of the X-ray spectrum based on the energies of X-rays detected by the photosensitive elements 2 (S208).

The controller 50 provides a display of an X-ray spectrum on the display section 62 and then terminates the processing sequence. The horizontal axis of the spectrum represents the energy axis and the vertical axis represents X-ray intensity (S210).

The calibration method for use in the analytical apparatus associated with the first modified embodiment involves the step of finding the energies of X-rays detected by the photosensitive elements 2 based on the positional relationship between the sample S and the diffraction grating 30 and on the positional relationship of the diffraction grating 30 to the photosensitive elements 2. In particular, the energies of X-rays detected by the photosensitive elements 2 are found using Eq. (5) above.

In this way, according to the calibration method for use in the analytical apparatus associated with the first modified embodiment, the energies of X-rays detected by the photosensitive elements 2 can be found from a theoretical formula about the diffraction grating based on the positional relationship between the sample S and the diffraction grating 30 and on the positional relationship of the diffraction grating 3 to the photosensitive elements 2. Consequently, the energies of X-rays detected by the photosensitive elements 2 can be found more accurately over the whole range of energies capable of being detected by the image sensor 40 than the case where calibration is done using a polynomial approximation. Hence, the energy axis of the X-ray spectrum can be calibrated accurately.

For example, where the energy axis of an X-ray spectrum is corrected using a polynomial approximation, the accuracy is extremely low outside an energy range located between peaks used for correction. Furthermore, where the energy axis of an X-ray spectrum is corrected using a polynomial approximation, if the number of peaks used for correction is fewer, the set order is inevitably reduced, resulting in a decrease in the accuracy.

In contrast, according to the calibration method for use in the analytical apparatus associated with the first modified embodiment, the energy axis of an X-ray spectrum can be corrected according to a theoretical formula about a diffraction grating and so does not suffer from the aforementioned problem with the use of a polynomial approximation. Accordingly, the energies of X-rays detected by the photosensitive elements 2 arranged in the energy dispersion direction A can be found accurately over the whole array of the photosensitive elements 2.

1.5.2. Second Modified Embodiment

An analytical apparatus associated with a second modified embodiment is next described. In the following description, only differences with the above-described analytical apparatus 100 are set forth; a description of similarities is omitted. The analytical apparatus associated with the second modified embodiment is similar in configuration to the analytical apparatus 100 already described in connection with FIG. 1 and thus a description and illustration thereof is omitted.

As described previously, in the analytical apparatus 100, an X-ray spectrum is acquired while bringing the focal plane of the diffraction grating 30 into positional coincidence with the photosensitive element 2*a* for detecting X-rays of the specified energy. Therefore, the focal plane deviates much from those of the photosensitive elements 2 which detect X-rays with energies remote from the specified energy, i.e., greater amounts of defocus take place.

Accordingly, in the analytical apparatus associated with the second modified embodiment, when an X-ray spectrum is displayed on the display section 62, the controller 50 displays only an energy range of the X-ray spectrum which is set based on the specified energy. Consequently, an X-ray spectrum consisting of only energies close to the specified energy is displayed on the display section 62. The energy range of the X-ray spectrum consisting of energies remote from the specified energy is not displayed on the display section 62.

The controller 50 may impose a limitation on the amount of movement of the sample S in the z direction based on the specified energy to prevent the amount of defocus from increasing beyond the present range. Because the analytical apparatus associated with the second modified embodiment performs the processing described above, any X-ray spectrum containing low resolution energy ranges is not offered to the user.

1.5.3. Third Modified Embodiment

Figure 12:
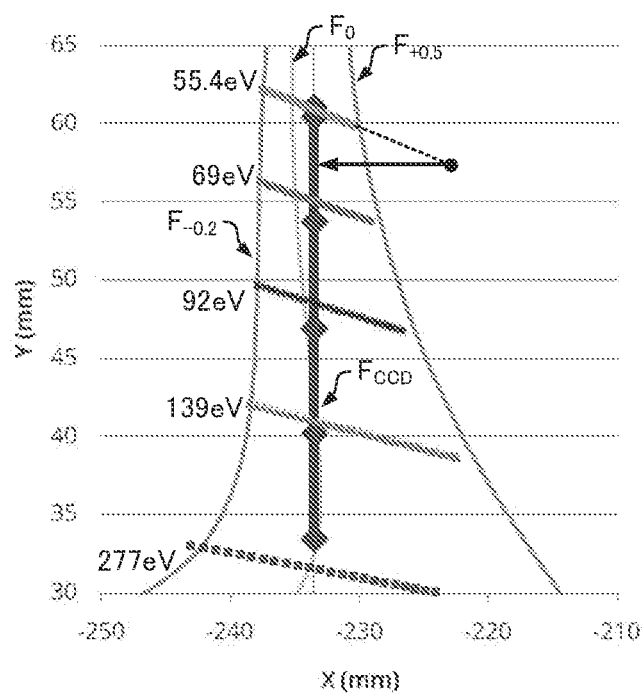
FIG. 12 is a diagram illustrating a relationship between the incident angle of X-rays and the focal plane of a diffraction grating.

FIG. 12 illustrates the relationship between the incident angle of X-rays and the focal plane of a diffraction grating. As shown in FIG. 12, if the amount of defocus is increased, the energies detected by the photosensitive elements 2 will deviate. For example, where the amount of defocus is small, X-rays with 55.4 eV are detected by the photosensitive elements 2 at the top end of the photosensitive surface $F_{CCD}$. If the amount of defocus is increased to the positive side, the X-rays with 55.4 eV are detected by the photosensitive elements 2 located below the photosensitive elements at the top end of the photosensitive surface $F_{CCD}$. In this way, by increasing the amount of defocus to the positive side, X-rays with lower energies can be detected as compared with the case where the amount of defocus is smaller. If the amount of defocus is increased to the negative side, X-rays with higher energies can be detected as compared with the case where the amount of defocus is smaller. The range of energies that can be detected by the image sensor 40 can be varied by adjusting the amount of defocus in this way.

1.5.4. Fourth Modified Embodiment

An analytical apparatus associated with a fourth modified embodiment is next described. In the following description, only the differences with the above-described analytical apparatus 100 are set forth; a description of similarities is omitted. In the analytical apparatus associated with the fourth embodiment, the image sensor 40 is different in configuration from the above-described analytical apparatus 100.

Figure 13:
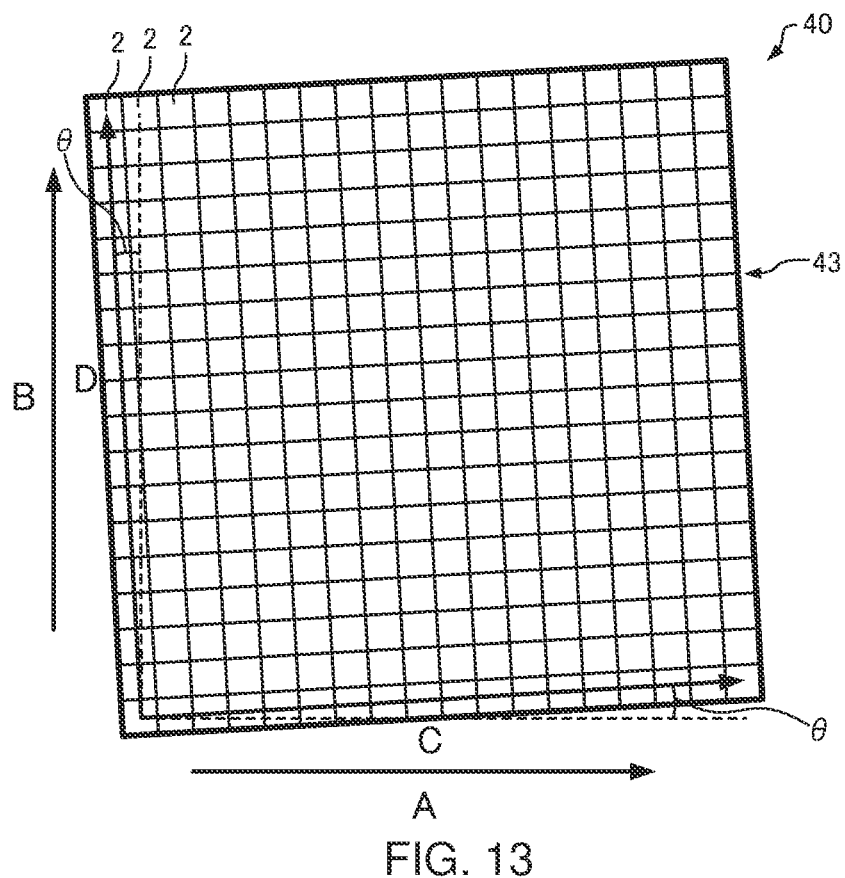
FIG. 13 is a schematic plan view of the photosensitive surface of an image sensor.

FIG. 13 is a schematic plan view of the photosensitive surface 43 of the image sensor 40. As shown in FIG. 13, the image sensor 40 has the photosensitive elements 2 arranged in plural rows and plural columns. In the photosensitive surface 43, the photosensitive elements 2 are arranged in the direction of rows C and in the direction of columns D. These directions C and D are perpendicular to each other. In the direction of rows C, the rows extend. In the direction of columns D, the columns run.

It is hereinafter assumed that the number of photosensitive elements 2 arranged in the direction of rows C is M (where M is an integer equal to or greater than 2) and that the number of photosensitive elements 2 arranged in the direction of columns D is N (where N is an integer equal to or greater than 2). That is, the image sensor 40 has M×N photosensitive elements 2. Note that the number M of photosensitive elements 2 arranged in the direction of rows C and the number N of photosensitive elements 2 arranged in the direction of columns D may be identical or different.

Each of the M×N photosensitive elements 2 can independently detect X-rays spectrally dispersed by the diffraction grating 30 and outputs a detection signal carrying information about the intensity of X-rays detected by a respective one of the photosensitive elements 2.

The energy dispersion direction A and the direction of rows C are neither parallel nor perpendicular to each other. Similarly, the divergence direction B and the direction of columns D are neither parallel nor perpendicular to each other. The angle θ made between the X-ray divergence direction B and the direction of columns D satisfies a relationship given by $$\theta = \tan^{-1}(1/N)$$

where 0°<θ<90°.

The controller 50 generates an X-ray spectrum based on the result of detection of X-rays made by the image sensor 40. Specifically, the controller 50 generates a row spectrum for each row based on the detection signal from each photosensitive element 2 arranged in the direction of rows C and thus generates plural row spectra. Then, the controller 50 generates an X-ray spectrum based on these row spectra.

A technique of generating such an X-ray spectrum is described below. First, a method of generating a spectrum by the analytical apparatus of a reference example is described. A method of generating a spectrum by the analytical apparatus associated with the fourth modified embodiment is described by comparing the technique for use in the analytical apparatus of the reference example and the technique for use in the analytical apparatus associated with the fourth modified embodiment.

Figure 14:
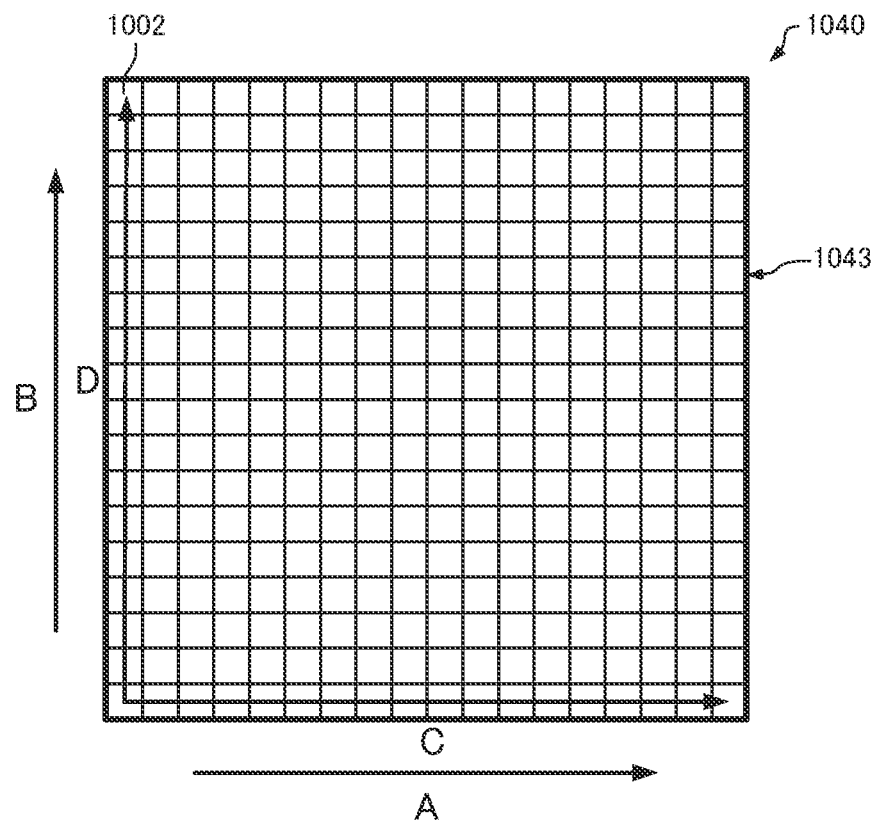
FIG. 14 is a schematic plan view of the photosensitive surface of the image sensor of an analytical apparatus of a reference example.

FIG. 14 is a schematic plan view of a photosensitive surface 1043 of an image sensor 1040 of the analytical apparatus of the reference example. It is assumed that the image sensor 1040 is a CCD image sensor having 2048× 2048 pixels. That is, in the image sensor 1040, 2048 photosensitive elements 1002 are arranged in the direction of rows C and 2048 photosensitive elements 1002 are arranged in the direction of columns D.

As shown in FIG. 14, in the image sensor 1040, the direction of energy dispersion A and the direction of rows C are parallel to each other, and the direction of divergence B and the direction or columns D are parallel to each other.

Figure 15:
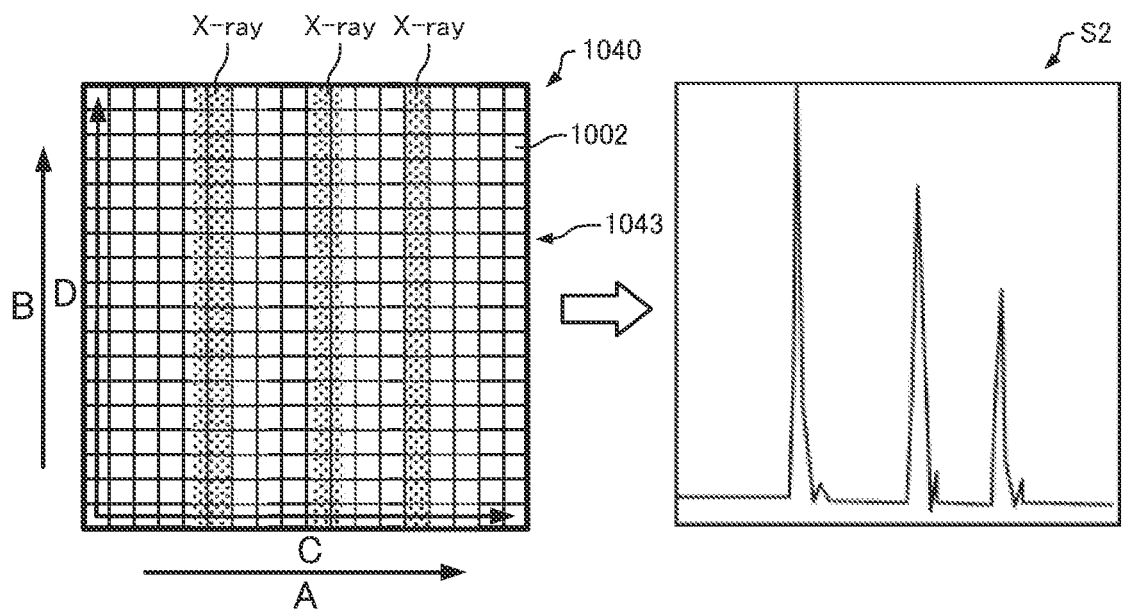
FIG. 15 is a diagram illustrating a method of creating a spectrum by the analytical apparatus of the reference example.

FIG. 15 illustrates a method of generating a spectrum in the analytical apparatus of the reference example. In the analytical apparatus of the reference example, as shown in FIG. 15, the intensities of X-rays detected by the photosensitive elements 1002 arranged in the direction of columns D are accumulated to generate an X-ray spectrum S2. In the analytical apparatus of the reference example, the direction of columns D is parallel to the X-ray divergence direction B and, therefore, X-rays with the same energy (wavelength) are detected by the 2048 photosensitive elements 1002 arranged in the same column. Accordingly, the intensities of the X-rays detected by the 2048 photosensitive elements 1002 arranged in the direction of columns D are accumulated to generate an X-ray spectrum S2.

In the X-ray spectrum S2, the horizontal axis denotes X-ray energy (wavelength) corresponding to the position of a photosensitive element 2 in the column direction C. In the X-ray spectrum S2, the vertical axis represents X-ray intensity. In this way, in the X-ray spectrum S2, the horizontal axis acts as an energy axis representing X-ray energy (wavelength), while the vertical axis serves as an intensity axis denoting X-ray intensity. The number of dots constituting the X-ray spectrum S2 is coincident with the number of photosensitive elements 1002 arranged in the row direction C. Therefore, the number of dots constituting the X-ray spectrum S2 is 2048.

Figure 16:
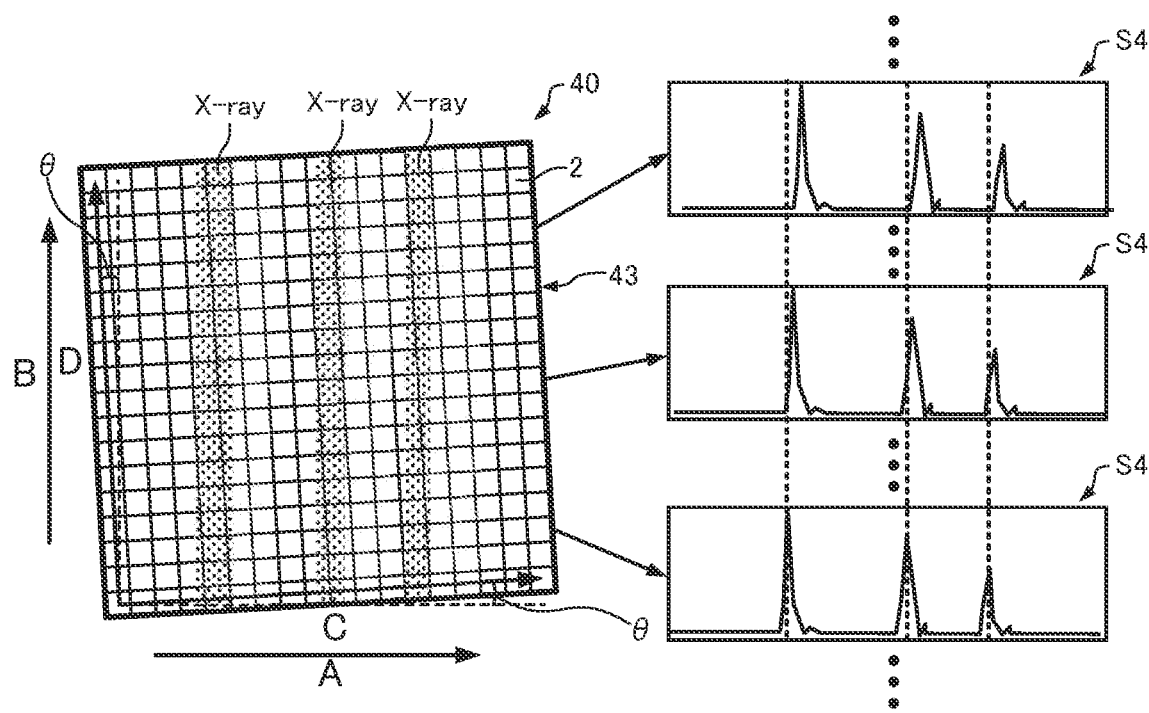
FIG. 16 is a diagram illustrating a method of creating a spectrum by an analytical apparatus associated with a fourth modified embodiment.

FIG. 16 illustrates a method of generating a spectrum in the analytical apparatus associated with the fourth embodiment. In the following description, only differences with the analytical apparatus of the above-described reference example are set forth; a description of similarities is omitted.

As shown in FIG. 16, the photosensitive surface 43 of the image sensor 40 is angularly shifted through angle θ relative to the image sensor 1040 shown in FIG. 14. Consequently, the X-ray divergence direction B and the direction of columns D make an angle of θ.

In the image sensor 40, there are 2048 photosensitive elements 2 arranged in the row direction C and there are 2048 photosensitive elements 2 arranged in the column direction D in the same way as in the analytical apparatus of the reference example of FIG. 14. That is, the number M of photosensitive elements 2 arranged in the row direction C=2,048. The number N of photosensitive elements 2 arranged in the column direction D=2,048. Therefore, the angle θ=tan$^{-1}$ (1/2048).

In the image sensor 40, the row spectrum S4 is generated for each row, and 2048 row spectra S4 are obtained. For example, for the first row, a row spectrum S4 is generated for the first line based on the intensities of X-rays detected by the 2048 photosensitive elements 2 arranged in the row direction C. Then, for the second row, a row spectrum S4 is produced based on the intensities of X-rays detected by the 2048 photosensitive elements 2 arranged in the row direction C. Similar processing is performed for the third and following rows. In this way, the processing for generating the row spectrum S4 is repeated from the first to 2048th row, and 2048 row spectra S4 are obtained.

Figure 17:
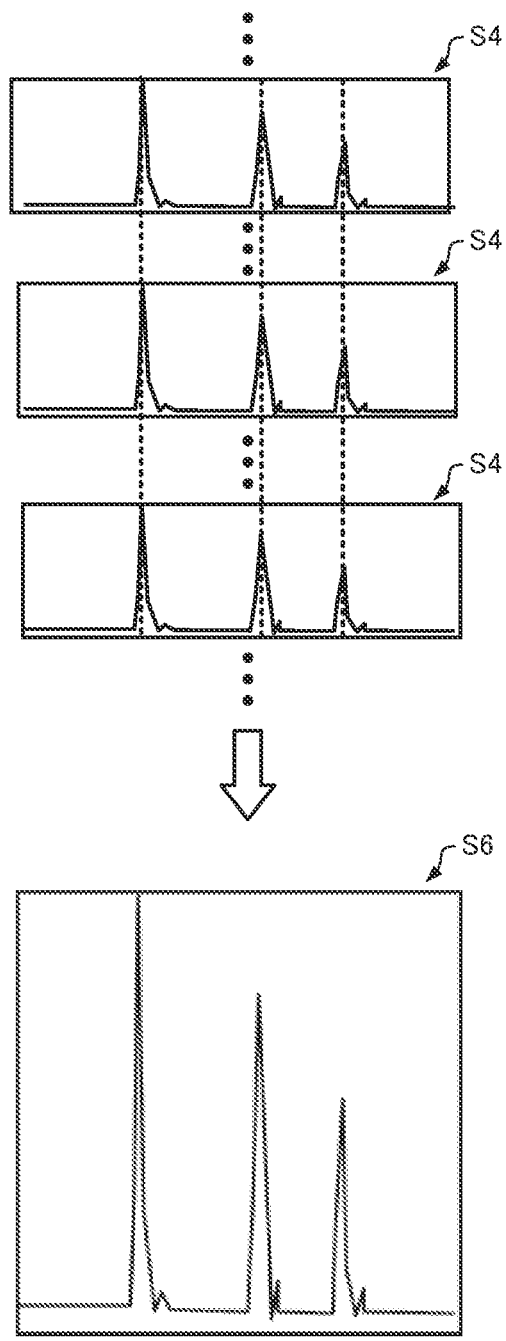
FIG. 17 is a diagram illustrating processing steps for correcting the energy axis of a row spectrum.

FIG. 17 illustrates processing for correcting the energy axis of each row spectrum S4. With respect to the 2048 row spectra S4, their horizontal axes, i.e., energy axes, are shifted from each other. Therefore, the energy axes of the row spectra S4 are corrected based on peaks of the row spectra S4. Specifically, as shown in FIG. 17, in the 2048 row spectra S4, the energy axes of the row spectra S4 are corrected such that the peaks of the corresponding peaks assume the same energy values.

Then, the 2048 row spectra S4 whose energy axes have been corrected are combined into one spectrum. For example, points constituting the 2048 row spectra S4 are plotted on a single graph. Thus, an X-ray spectrum S6 can be created.

The X-ray spectrum S6 shown in FIG. 17 is made up of 2048×2048 points. The interval between the adjacent points is 1/2048 of that of the X-ray spectrum S2 shown in FIG. 15. That is, the resolution of the energy axis of the X-ray spectrum S6 is 2048 times as high as the resolution of the energy axis of the X-ray spectrum S2.

In the foregoing, each one photosensitive element 1002 or 2 is a single pixel of the CCD image sensor. The same principle applies where pixels constituting a CCD image sensor are binned.

Where 128×128 pixels make up a single photosensitive element 2, for example, in the X-ray spectrum S6 generated by the image sensor 40, the interval between adjacent points is reduced by a factor of 16 as compared with the X-ray spectrum S2 generated by the analytical apparatus of the reference example. That is, the resolution of the energy axis of the X-ray spectrum S6 is 16 times as high as the resolution of the energy axis of the X-ray spectrum S2.

The analytical apparatus associated with the fourth modified embodiment has the photosensitive elements 2 arranged in plural rows and plural columns. The divergence direction B of X-rays impinging on the image sensor 40 and the column direction D are neither parallel nor perpendicular to each other. The controller 50 performs: a processing step for generating a row spectrum S4 for each row based on detection signals from the photosensitive elements 2 arranged in the row direction C and acquiring plural row spectra S4; and generating an X-ray spectrum S6 based on the plural row spectra S4. Therefore, in the X-ray spectrum generated by the analytical apparatus associated with the fourth modified embodiment, the interval between adjacent points can be reduced as compared with the case where the X-ray divergence direction B and the column direction D are parallel to each other. As a result, the resolution of X-ray spectra can be enhanced.

The image sensor included in the analytical apparatus associated with the fourth modified embodiment is not restricted to the image sensor 40 tilted by a given angle as shown in FIG. 16. For example, if the array of photosensitive elements 2 is distorted or misaligned and thus the divergence direction B of X-rays impinging on the image sensor and the column direction D are neither parallel nor perpendicular to each other, the image sensor may still be usable.

2. Second Embodiment 2.1. Analytical Apparatus

Figure 18:
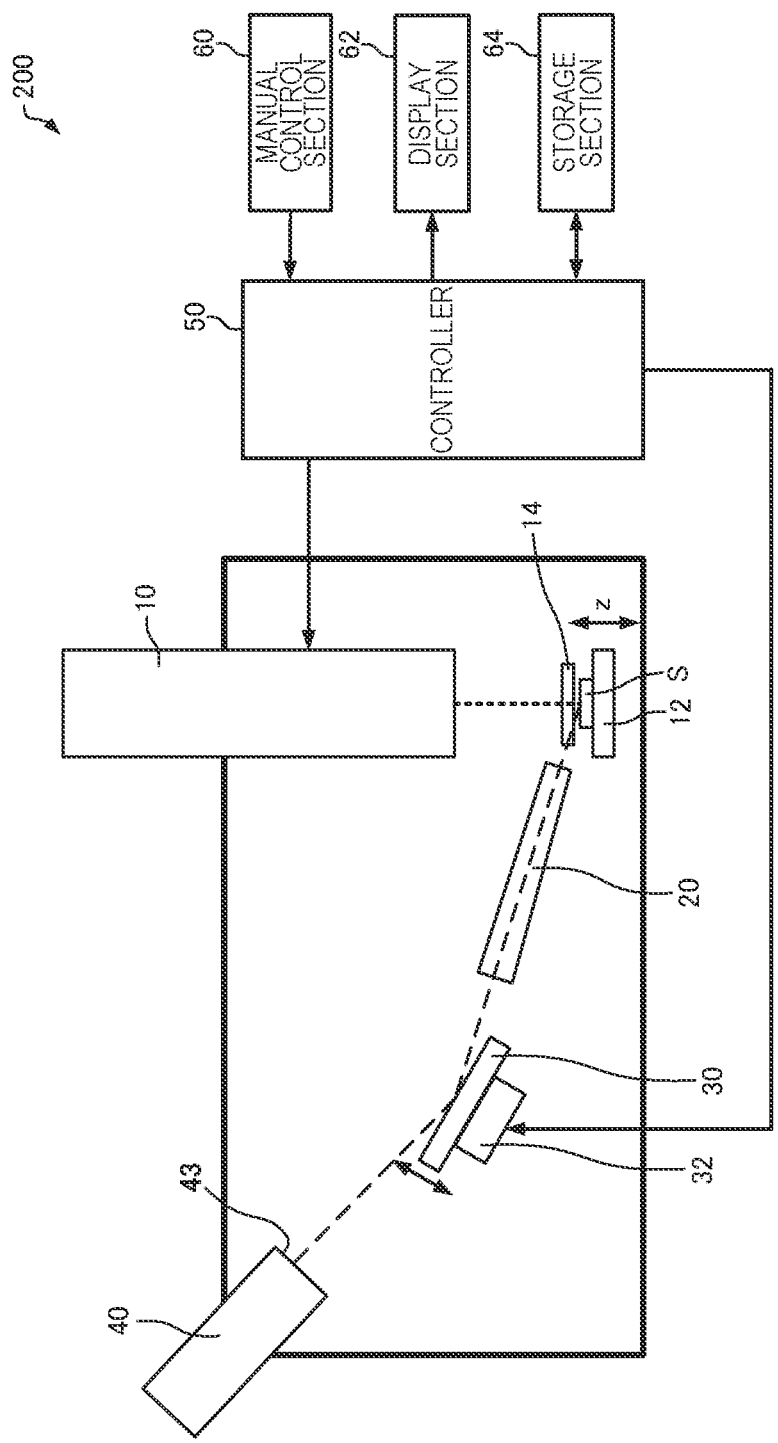
FIG. 18 is a block diagram of an analytical apparatus associated with a second embodiment.

An analytical apparatus associated with a second embodiment is next described by referring to FIG. 18, which shows the configuration of the analytical apparatus, 200, associated with the second embodiment. Those members of the analytical apparatus 200 which are similar in function to their counterparts of the analytical apparatus 100 associated with the first embodiment are indicated by the same reference numerals as in the foregoing figures and a detailed description thereof is omitted.

In the above-described analytical apparatus 100, the sample S is moved in the z direction to thereby adjust the incident angle θ of X-rays. In contrast, in the analytical apparatus 200, the incident angle α of X-rays is adjusted by moving the diffraction grating 30.

As shown in FIG. 18, the analytical apparatus 200 includes a diffraction grating drive mechanism 32 for moving the diffraction grating 30. The drive mechanism 32 has a piezoelectric device which operates to move the diffraction grating 30. In the analytical apparatus 200, the diffraction grating drive mechanism 32 functions as an incident angle control mechanism for controlling the incident angle α of X-rays.

Figure 19:
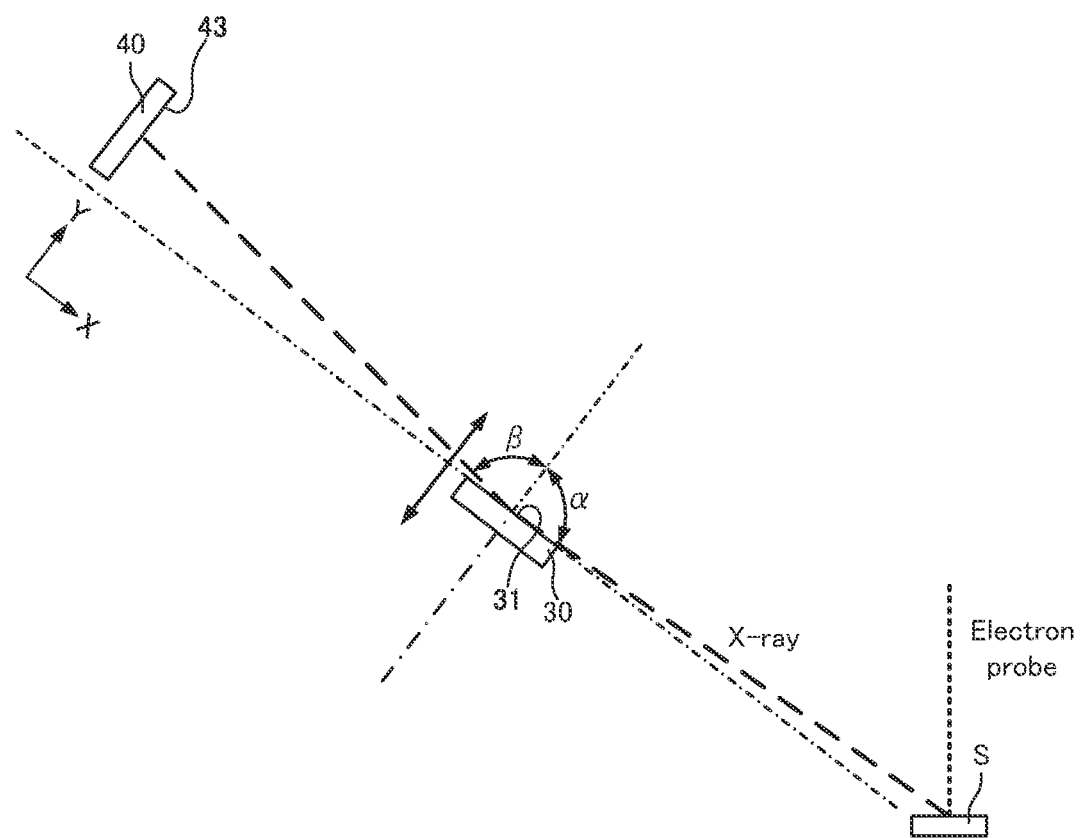
FIG. 19 is a diagram illustrating one example of the operation of a diffraction grating drive mechanism.

FIG. 19 illustrates the operation of the diffraction grating drive mechanism 32. As shown in FIG. 19, the drive mechanism 32 moves the diffraction grating 30 along a normal of the diffraction plane 31, whereby the incident angle α of X-rays is varied.

In the analytical apparatus 200, the diffraction grating 30 is moved along a normal of the diffraction plane 31 using the diffraction grating drive mechanism 32, thus adjusting the position of the focal plane of the diffraction grating 30. Consequently, the focal plane of the diffraction grating 30 can be brought into positional coincidence with the photosensitive element 2a for detecting X-rays with the specified energy.

The analytical method for use in the analytical apparatus 200 is similar to the analytical method for use in the analytical apparatus 100 except that the incident angle α of X-rays is adjusted by moving the diffraction grating 30 and so a description thereof is omitted.

In the analytical apparatus 200, the controller 50 controls and actuates the diffraction grating drive mechanism 32 based on the specified energy of X-rays to bring the focal plane of the diffraction gratings 30 into positional coincidence with the photosensitive element 2a for detecting X-rays with the specified energy. Therefore, the analytical apparatus 200 is similar in operation and effects to the above-described analytical apparatus 100.

2.2. Modified Embodiments 2.2.1. First Modified Embodiment

Figure 20:
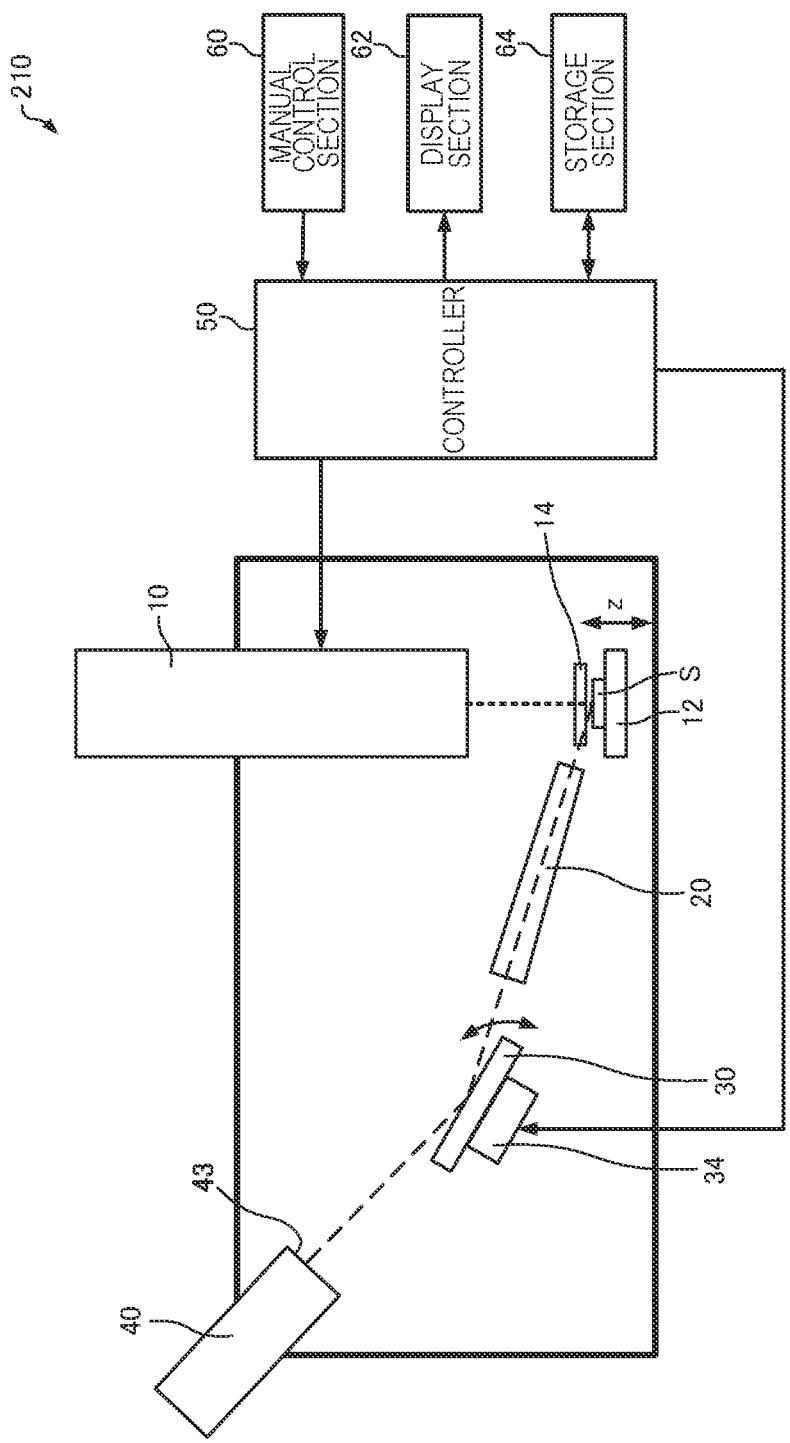
FIG. 20 is a diagram showing the configuration of an analytical apparatus associated with a first modification of the second embodiment.

FIG. 20 shows the configuration of an analytical apparatus, 210, associated with a first modified embodiment. Those members of the analytical apparatus 210 which are similar in function to their counterparts of the analytical apparatus 200 associated with the second embodiment are indicated by the same reference numerals as in the foregoing figures and a detailed description thereof is omitted.

In the above-described analytical apparatus 200, the incident angle α of X-rays is adjusted by moving the diffraction grating 30. In contrast, in the analytical apparatus 210, the incident angle α of X-rays is adjusted by rotating the diffraction grating 30.

As shown in FIG. 20, the analytical apparatus 210 includes a diffraction grating rotating mechanism 34 for rotating the diffraction grating 30. The rotating mechanism 34 has a piezoelectric device which operates to rotate the diffraction grating 30. In the analytical apparatus 210, the diffraction grating rotating mechanism 34 functions as a control mechanism for controlling the incident angle α of X-rays.

Figure 21:
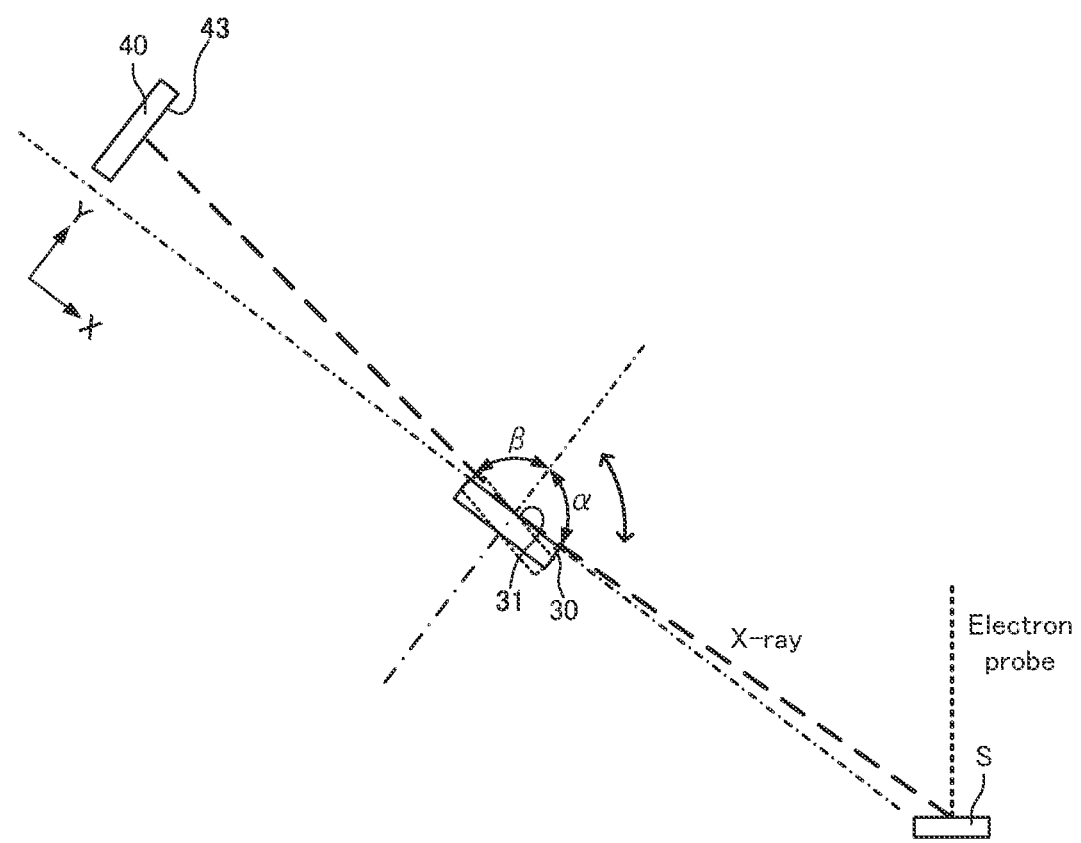
FIG. 21 is a diagram showing another example of the operation of the diffraction grating drive mechanism.

FIG. 21 illustrates the operation of the diffraction grating rotating mechanism 34. As shown in FIG. 21, the diffraction grating rotating mechanism 34 rotates the diffraction grating 30 about a given axis. Consequently, the incident angle α of X-rays can be varied.

In the analytical apparatus 210, the controller 50 controls the operation of the diffraction grating rotating mechanism 34 based on the specified energy of X-rays to bring the focal plane of the diffraction grating 30 into positional coincidence with the photosensitive element 2a for detecting X-rays with the specified energy. Consequently, the analytical apparatus 210 is similar in operation and effects to the above-described analytical apparatus 200.

2.2.2. Second Modified Embodiment

The first, second, third, and fourth modified embodiments of the analytical apparatus 100 associated with the above-described first embodiment are also applicable to the analytical apparatus 200 associated with the second embodiment.

3. Others

It is to be noted that the foregoing embodiments and modified embodiments are merely exemplary of the invention and that the invention is not restricted thereto. The invention can be practiced in variously modified forms without departing from the subject matter of the present invention.

For example, in the embodiment described in relation to FIG. 1, X-rays emanating from the sample S are spectrally dispersed by the diffraction grating 30. The spectrally dispersive element for spectrally dispersing X-rays produced from the sample S is not restricted to this diffraction grating. Any other spectrally dispersive element may be used as long as it can provide continuous energy dispersion of X-rays. One example of such a spectrally dispersive element is a zone plate.

Furthermore, in the above embodiments, the sample S is irradiated with an electron beam. X-rays may be produced from the sample S by irradiating it with a primary beam other than an electron beam. Examples of such a primary beam include X-rays and ultraviolet radiation.

It is to be noted that the above-described embodiments and modified embodiments are merely exemplary and that the present invention is not restricted thereto. For example, the various embodiments and modified embodiments can be combined appropriately.

The present invention is not restricted to the foregoing embodiments but rather can be implemented in various modified forms. For example, the present invention embraces configurations (e.g., configurations identical in function, method, and results or identical in purpose and advantageous effects) which are substantially identical to the configurations described in any one of the above embodiments. Furthermore, the invention embraces configurations which are similar to the configurations described in any one of the above embodiments except that their nonessential portions have been replaced. Additionally, the invention embraces configurations which are identical in advantageous effects to, or which can achieve the same object as, the configurations described in any one of the above embodiments. Further, the invention embraces configurations which are similar to the configurations described in any one of the above embodiments except that a well-known technique is added.

What is claimed is:

1. An analytical method for use in an analytical apparatus having a spectrally dispersive element for spectrally dispersing X-rays emanating from a sample, said analytical method comprising the steps of:
   providing an image sensor operative to detect spectrally dispersed X-rays emanating from the sample, the image sensor having a plurality of photosensitive elements arranged in a direction of energy dispersion;
   providing an incident angle control mechanism for controlling an incident angle of X-rays impinging on the spectrally dispersive element;
   specifying an energy of X-rays to be acquired;
   calculating an incident angle of X-rays from the specified energy and a distance between the plurality of photosensitive elements, which detect X-rays having the specified energy, and a focal plane of the spectrally dispersive element; and
   adjusting the incident angle of X-rays impinging on the spectrally dispersive element based on the incident angle of X-rays calculated from the specified energy and the distance, wherein the incident angle is adjusted to bring the focal plane of the spectrally dispersive element into positional coincidence with one or more of the plurality of photosensitive elements which detect X-rays having the specified energy.

2. An analytical method as set forth in claim 1, wherein the incident angle control mechanism comprises a sample stage having a drive mechanism, and wherein adjusting the incident angle of X-rays impinging on the spectrally dispersive element comprises:
   adjusting the incident angle of X-rays impinging on the spectrally dispersive element by moving the sample via the drive mechanism of the sample stage.

3. An analytical method as set forth in claim 1, wherein the incident angle control mechanism comprises a drive mechanism, and wherein adjusting the incident angle of X-rays impinging on the spectrally dispersive element comprises:
   adjusting the incident angle of X-rays impinging on the spectrally dispersive element by moving the spectrally dispersive element via the drive mechanism.

4. An analytical method as set forth in claim 1, wherein the incident angle control mechanism comprises a rotational drive mechanism, and wherein adjusting the incident angle of X-rays impinging on the spectrally dispersive element comprises:
   adjusting the incident angle of X-rays impinging on the spectrally dispersive element by rotating the spectrally dispersive element via the rotational drive mechanism.

5. An analytical method as set forth in claim 1, further comprising:
   detecting X-rays by the plurality of photosensitive elements, respectively; and
   finding energies of X-rays detected respectively by the plurality of photosensitive elements based on a positional relationship between said sample and said spectrally dispersive element and on a positional relationship of the spectrally dispersive element to the plurality of photosensitive elements.

6. An analytical apparatus comprising:
   a spectrally dispersive element for spectrally dispersing X-rays emanating from a sample;
   an image sensor operative to detect the spectrally dispersed X-rays and having a plurality of photosensitive elements arranged in a direction of energy dispersion;

an incident angle control mechanism for controlling the incident angle of X-rays impinging on the spectrally dispersive element, wherein the incident angle control mechanism comprises a sample stage, a drive mechanism comprising a piezoelectric device for moving the spectrally dispersive element, or a rotational drive mechanism comprising a piezoelectric device for rotating the spectrally dispersive element; and a controller for controlling the incident angle control mechanism;

wherein the controller controls the incident angle control mechanism based on a specified energy of X-rays to bring a focal plane of the spectrally dispersive element into positional coincidence with those one or ones of the plurality of photosensitive elements which detect X-rays having the specified energy, wherein, when controlling the incident angle control mechanism, the controller is programmed or configured to:

receive an input for the specified energy of X-rays to be acquired;

calculate an incident angle of X-rays from the specified energy and a distance between the plurality of photosensitive elements, which detect X-rays having the specified energy, and a focal plane of the spectrally dispersive element; and adjust the incident angle of X-rays impinging on the spectrally dispersive element based on the incident angle of X-rays calculated from the specified energy and the distance, wherein the incident angle is adjusted to bring the focal plane of the spectrally dispersive element into positional coincidence with one or more of the plurality of photosensitive elements which detect X-rays having the specified energy.

* * * * *